B. L. FROEHLY.
SAFETY PIN.
APPLICATION FILED NOV. 4, 1916.

1,246,582.

Patented Nov. 13, 1917.

WITNESSES

INVENTOR
B. L. Froehly
BY
ATTORNEYS

UNITED STATES PATENT OFFICE.

BERTRAM L. FROEHLY, OF NEW YORK, N. Y.

SAFETY-PIN.

1,246,582.　　　Specification of Letters Patent.　　Patented Nov. 13, 1917.

Application filed November 4, 1916. Serial No. 129,433.

*To all whom it may concern:*

Be it known that I, BERTRAM L. FROEHLY, a citizen of the United States, and a resident of the city of New York, borough of Manhattan, in the county and State of New York, have invented a new and Improved Safety-Pin, of which the following is a full, clear, and exact description.

This invention relates to safety pins of the "lie flat" type, as disclosed in the United States Letters Patent 849217, granted April 2, 1907, wherein the pin or thrust member extends across the back or body member of the pin. In this type of safety pin the back member is provided with an offset or hump between its ends so as to provide sufficient clearance between the thrust and back members to accommodate the cloth.

The object of the present invention is to provide this clearance between the thrust and back members without resorting to the hump or offset portion and leaving both of such members straight or substantially so. This result is accomplished by providing a coil of one or a plurality of convolutions at the junction between the thrust and back members, as distinguished from the single bend of the patented structure above referred to. The more the convolutions in the coil the greater will be the space between the thrust and back members, and consequently in pins intended for very thick fabric it is preferable to use more than one coil.

With such objects in view, and others which will appear as the description proceeds, the invention comprises various novel features of construction and arrangement of parts which will be set forth with particularity in the following description and claims appended hereto.

In the accompanying drawing, which illustrates certain embodiments of the invention and wherein similar characters of reference indicate corresponding parts in all the views, Figure 1 is a plan view of the safety pin with the thrust or pointed member shown by full lines in open position and by dotted lines in closed position;

Fig. 2 is a side view of the safety pin closed;

Figs. 3 and 4 are transverse sections respectively on the lines 3—3 and 4—4, Fig. 2;

Figure 1:
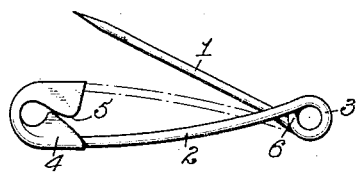
Figure 2:
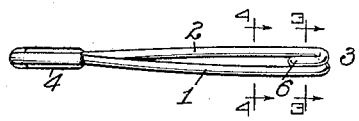
Figure 3:
Figure 4:
Figure 5:
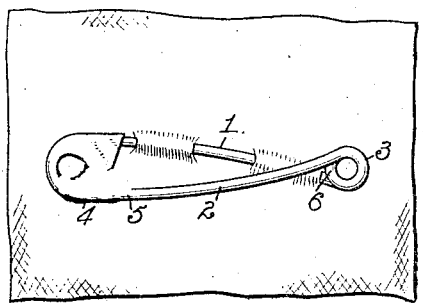
Fig. 5 is a plan view showing the safety pin in use.
Figure 6:
Fig. 6 is a side view of a safety pin having a coil formed of a plurality of convolutions.

Referring to the drawing, 1 designates the thrust or pointed member of the safety pin, 2 the back member or body, 3 the coil, and 4 the cap or guard, which latter may be of any approved construction, as it forms no particular part of the present invention, except that the opening of the mouth 5 of the guard opens inwardly or toward the back member 2. The members 1 and 2 cross each other adjacent the coil 3, and they are permanently separated or out of contact by reason of the convolutions of the coil, the axis of the coil being at right-angles to the plane of the safety pin as a whole. In other words, between the members 1 and 2 are one or more convolutions 6, as in Figs. 1 to 4 inclusive, or a plurality of convolutions 7, as shown in Fig. 6. It will thus be seen that the back member 2 need not be bent, overset or humped, as in the said patent hereinbefore referred to, for providing clearance between the members 1 and 2 for accommodating the thickness of the cloth fastened by the safety pin. The safety pin is applied in the usual manner to the article or articles to be pinned, and when the point of the thrust member is engaged with the cap or guard, the pin lies flat on the article or articles pinned, the advantage of which is apparent.

From the foregoing description taken in connection with the accompanying drawing, the advantages of the construction and method of operation will be readily understood by those skilled in the art to which the invention appertains, and while I have described the principle of operation, together with the article which I now consider to be the best embodiment thereof, I desire to have it understood that the article shown is merely illustrative and that such changes may be made when desired as fall within the scope of the appended claims.

Having thus described my invention, I claim as new and desire to secure by Letters Patent:

1. A safety pin comprising thrust and body members disposed in crossing relation and spaced from each other, a coil connecting the said members together at one end of the pin, and a guard at the opposite end of the pin and having its mouth opening toward the body member, the point of crossing of the members being slightly spaced inwardly from the coil.

2. A safety pin comprising a substantially straight thrust member, a substantially straight body member, a coil of a plurality of convolutions connecting the members at one end of the pin and maintaining the said members in crossed and spaced relation, and a guard on the body member at the end of the pin opposite from the coil and with which the point of the thrust member is engageable, the point of crossing of the members being slightly spaced inwardly from the coil.

BERTRAM L. FROEHLY.